(12) United States Patent
Rosinski et al.

(10) Patent No.: US 11,146,149 B2
(45) Date of Patent: Oct. 12, 2021

(54) MOTOR FOR VEHICLE TRANSMISSION PUMP HAVING A SENSOR AND A MAGNET SEPARATED BY A NON-MAGNETIC BARRIER

(71) Applicant: GHSP, Inc., Grand Haven, MI (US)

(72) Inventors: Ryan Rosinski, Whitehall, MI (US); Jian Peng He, Grand Haven, MI (US)

(73) Assignee: GHSP, Inc., Grand Haven, MI (US)

( * ) Notice: Subject to any disclaimer, the term of this patent is extended or adjusted under 35 U.S.C. 154(b) by 0 days.

(21) Appl. No.: 16/411,499

(22) Filed: May 14, 2019

(65) Prior Publication Data

US 2019/0348893 A1 Nov. 14, 2019

Related U.S. Application Data

(60) Provisional application No. 62/671,196, filed on May 14, 2018.

(51) Int. Cl.
| | |
|---|---|
| *H02K 5/10* | (2006.01) |
| *H02K 11/215* | (2016.01) |
| *H02K 5/22* | (2006.01) |
| *H02K 21/16* | (2006.01) |
| *H02K 7/08* | (2006.01) |
| *F16H 61/00* | (2006.01) |
| *F04D 13/06* | (2006.01) |

(52) U.S. Cl.
CPC ............. *H02K 11/215* (2016.01); *H02K 5/10* (2013.01); *H02K 5/225* (2013.01); *H02K 7/083* (2013.01); *H02K 21/16* (2013.01); *F04D 13/06* (2013.01); *F16H 61/0031* (2013.01); *H02K 2211/03* (2013.01)

(58) Field of Classification Search
CPC ......... H02K 11/215; H02K 5/10; F04D 13/06
USPC ........................................................... 310/71
See application file for complete search history.

(56) References Cited

U.S. PATENT DOCUMENTS

| | | | |
|---|---|---|---|
| 2016/0156246 A1* | 6/2016 | Hotori .................... | H02K 5/225 310/43 |
| 2016/0181885 A1* | 6/2016 | Yamasaki ............ | B62D 5/0403 180/443 |

* cited by examiner

*Primary Examiner* — Terrance L Kenerly
(74) *Attorney, Agent, or Firm* — Price Heneveld LLP (57) ABSTRACT

An electric motor is provided that includes: a stator assembly; a rotor assembly for rotating inside the stator assembly, the rotor assembly including a shaft; a magnet mounted on the shaft of the rotor assembly; a printed circuit board; a magnetic sensor mounted on the printed circuit board; and an overmold assembly having a membrane disposed between the magnet and the magnetic sensor such that the magnetic sensor can sense the angular position of the magnet through the membrane.

20 Claims, 8 Drawing Sheets

MOTOR FOR VEHICLE TRANSMISSION PUMP HAVING A SENSOR AND A MAGNET SEPARATED BY A NON-MAGNETIC BARRIER

CROSS-REFERENCE TO RELATED APPLICATION

This application claims priority to and the benefit under 35 U.S.C. § 119(e) of U.S. Provisional Patent Application No. 62/671,196, filed on May 14, 2018, entitled "MOTOR FOR VEHICLE TRANSMISSION PUMP HAVING A SENSOR AND A MAGNET SEPARATED BY A NON-MAGNETIC BARRIER," by Ryan Rosinski et al., the entire disclosure of which is incorporated herein by reference.

FIELD OF THE INVENTION

The present invention generally relates to a motor construction, and more particularly, to a motor configured for mounting within a hole formed in a vehicle transmission housing.

SUMMARY OF THE INVENTION

According to one aspect of the present invention, an electric motor is provided that comprises: a stator assembly; a rotor assembly for rotating inside the stator assembly, the rotor assembly including a shaft; a magnet mounted on the shaft of the rotor assembly; a printed circuit board; a magnetic sensor mounted on the printed circuit board; and an overmold assembly having a membrane disposed between the magnet and the magnetic sensor such that the magnetic sensor can sense the angular position of the magnet through the membrane.

According to another aspect of the present invention, an electric motor is provided that comprises: an overmold assembly having a membrane at one end and an opening at an opposite end, the opening extending through the overmold assembly up to the membrane; a stator assembly disposed in the opening of the overmold assembly, the stator assembly including a stator opening; a rotor assembly for rotating inside the opening of the stator assembly, the rotor assembly including a shaft; a magnet mounted on the shaft of the rotor assembly; a cover mounted to the overmold assembly to provide a sealed chamber between the cap and the membrane; a printed circuit board mounted in the sealed chamber; and a magnetic sensor mounted on the printed circuit board in a position juxtaposed to the magnet with the membrane in between such that the magnetic sensor can sense the angular position of the magnet through the membrane.

According to another aspect of the present invention, an electric motor is provided that comprises: an overmold assembly having a membrane at one end and an opening at an opposite end, the opening extending through the overmold assembly up to the membrane, wherein the overmold assembly has a groove formed in a top raised edge surrounding the membrane; a seal positioned in the groove to seal the cover to the overmold assembly; a cover mounted to the overmold assembly to provide a sealed chamber between the cap and the membrane; a printed circuit board mounted in the sealed chamber; a stator assembly disposed in the opening of the overmold assembly and electrically coupled to the printed circuit board through sealed apertures formed through the membrane, the stator assembly including a stator opening; a rotor assembly for rotating inside the opening of the stator assembly, the rotor assembly including a shaft; a magnet mounted on the shaft of the rotor assembly; and a magnetic sensor mounted on the printed circuit board in a position juxtaposed to the magnet with the membrane in between such that the magnetic sensor can sense the angular position of the magnet through the membrane.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

A motor 10 is shown in FIGS. 1-10 according to a first embodiment. The motor 10 is configured for mounting within a hole formed in a vehicle transmission housing such that a portion of the motor 10 extends into the hole while a portion of the motor 10 remains outside the transmission housing. The motor 10 may be used to turn an impeller (not shown) of a pump internal to the transmission housing as is known in the art.

As shown in FIGS. 1-4, the motor 10 includes an overmold assembly 20 having an electrical connector port 21 and a printed circuit board (PCB) cover 25 that is secured to the overmold assembly 20 by fasteners 28, which may be screws or the like. A raised edge of the overmold assembly 20 that surrounds a membrane 29 of the overmold assembly 20 and faces the PCB cover 25, includes a groove 22 for receiving a PCB cover seal 27, which forms a sealed chamber 23 between the membrane 29 of the overmold assembly 20 and the PCB cover 25, in which a PCB 30 is mounted. The PCB 30 is provided for controlling operation of the motor 10 and for sensing operational parameters. The PCB 30 may include a plurality of apertures 31 through which a corresponding plurality of connector terminals 41 extend. The plurality of connector terminals 41 extend through the electrical connector port 21 so that electrical connection can be made to other components of the vehicle and so that power and control signals may be provided to the PCB 30.

The PCB 30 may also include a second plurality of apertures 32 for receiving a corresponding plurality of motor terminals 42. The plurality of motor terminals 42 extend through apertures 20a in the membrane 29 of the overmold assembly 20 so that electrical connection can be made to a stator assembly 60 from the PCB 30. The apertures 20a may be sealed so that liquid may not pass into the sealed chamber 23.

A thermal pad 35 may be provided on the PCB 30 for dissipating heat from electronic components on the PCB 30.

Figure 5:
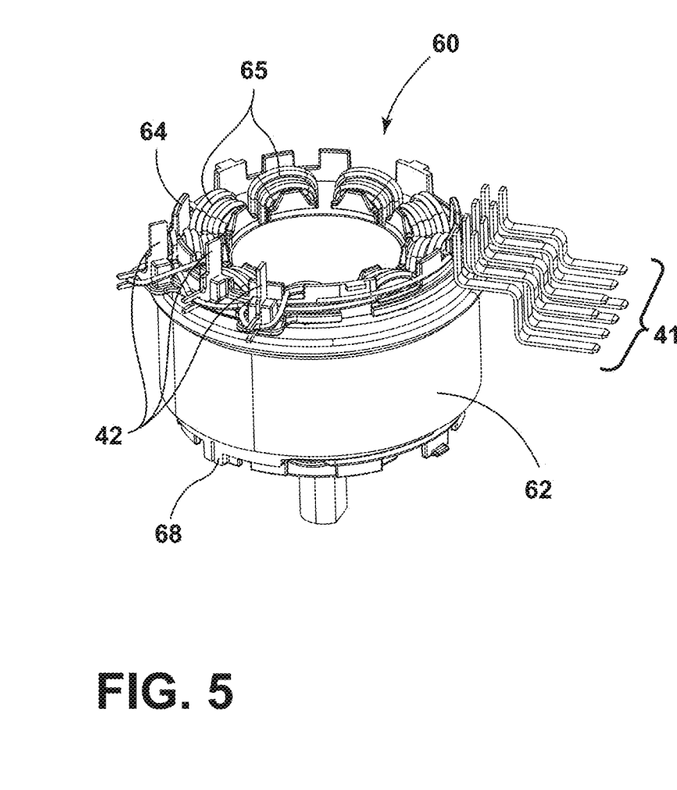
FIG. 5 is a perspective view of a stator assembly used in the motor shown in FIG. 1.

FIG. 5 shows an example of the stator assembly 60 that may be provided within the overmold assembly 20. The stator assembly 60 includes an LAM stack 62 having an upper end cap 64 inserted therein at one end and a lower end cap 68 inserted at the opposite end of the stator assembly 60. Wire may then be wound within LAM stack 62 and end cap 64 to form windings 65. The end cap 64 may be configured to support the motor terminals 42 where they connect to the windings 65.

Figure 1:
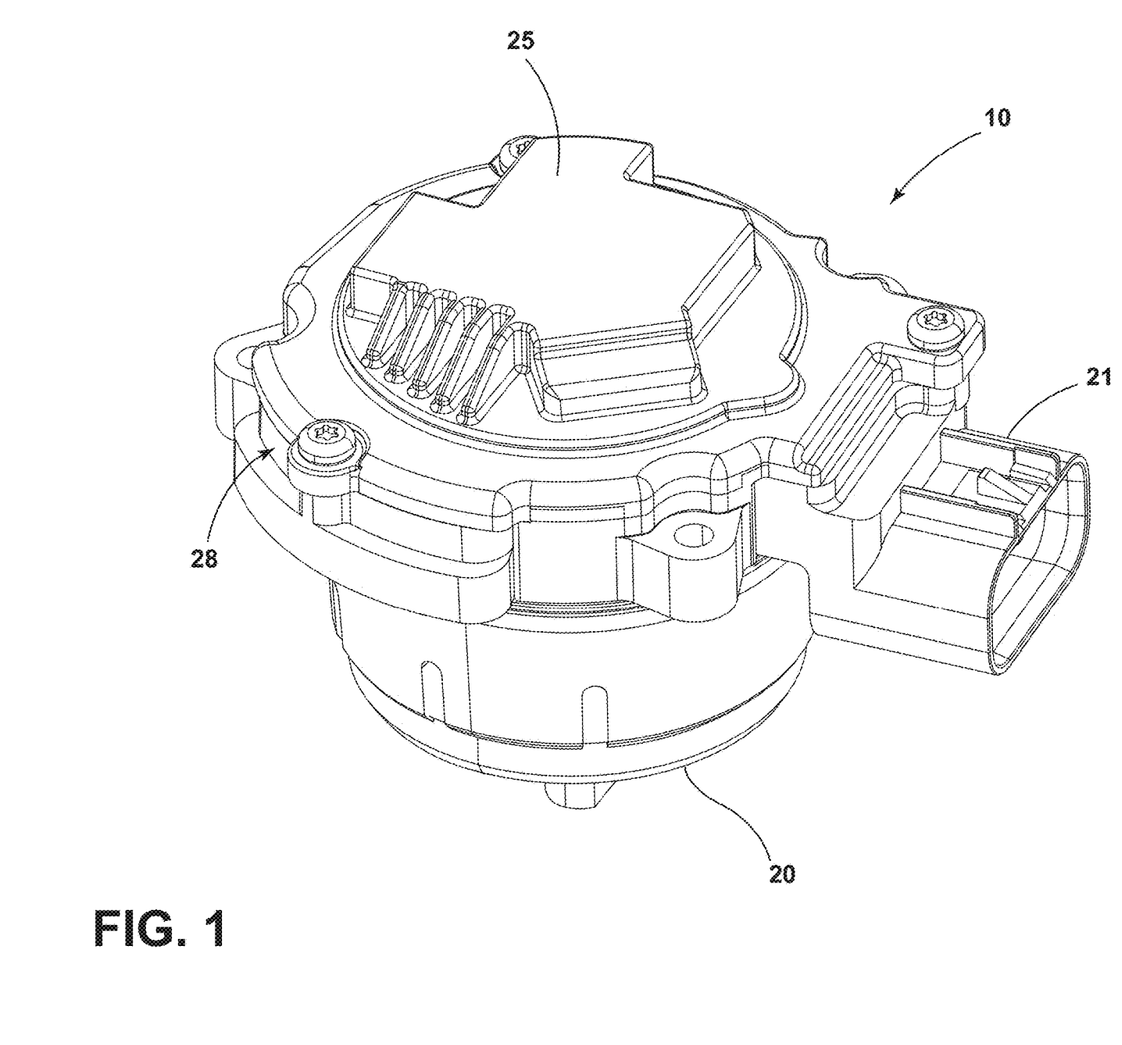
FIG. 1 is a perspective view of a motor according to an embodiment described herein.
Figure 2:
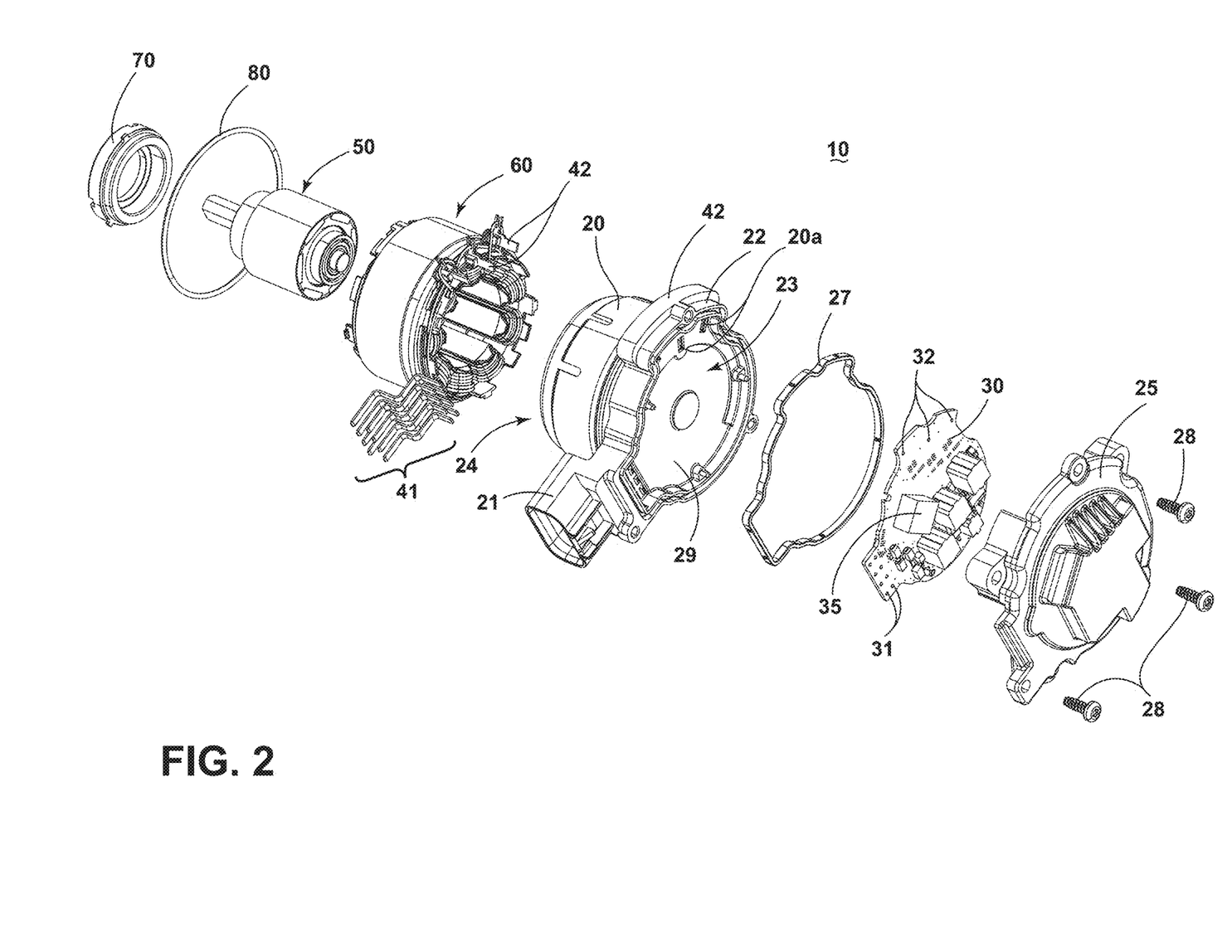
FIG. 2 is an exploded perspective view of the motor shown in FIG. 1.
Figure 3:
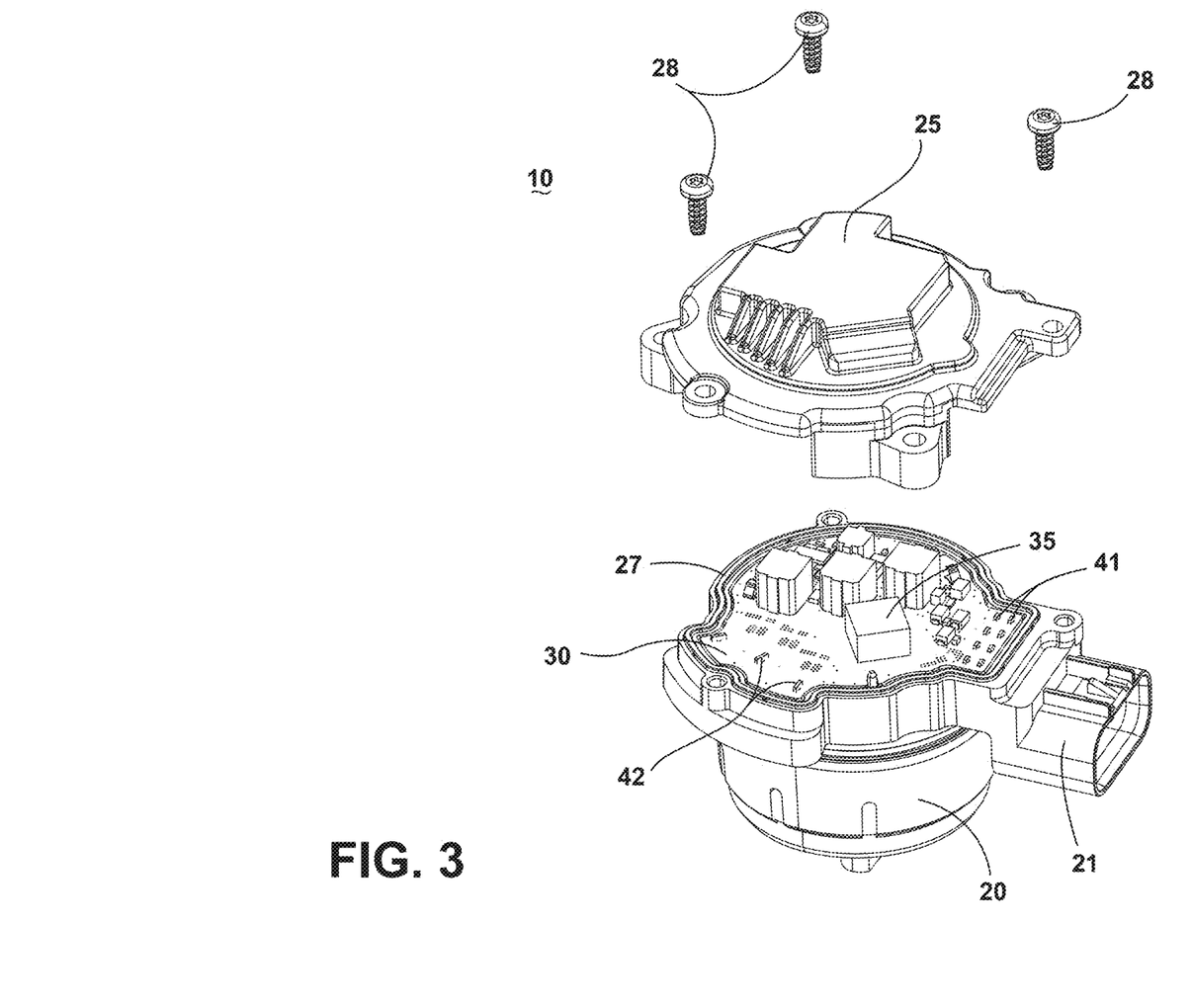
FIG. 3 is a partially exploded perspective view of the motor shown in FIG. 1.
Figure 4:
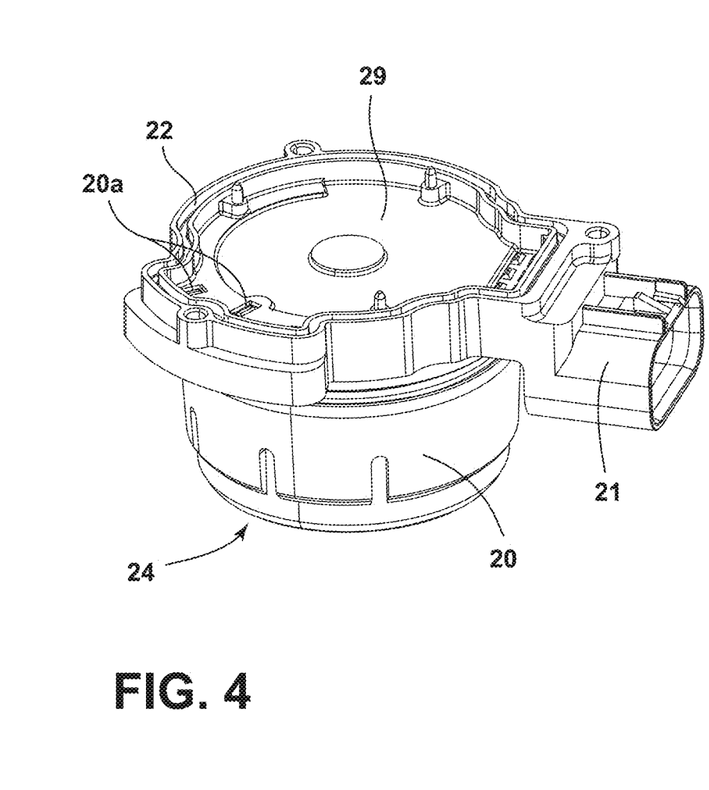
FIG. 4 is a perspective view of a portion of the motor shown in FIG. 1 showing interior components thereof.
Figures 6, 7:
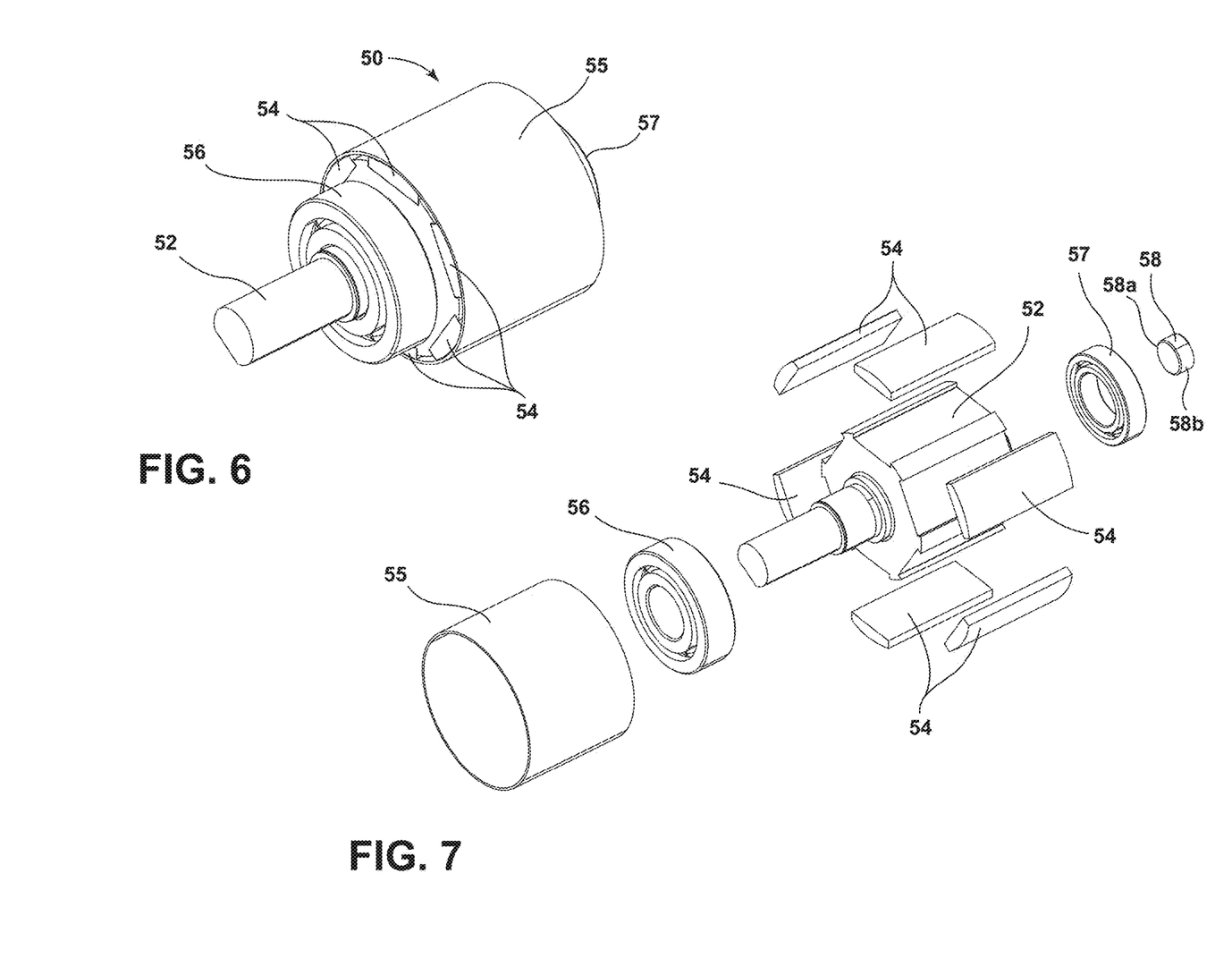
FIG. 6 is a perspective view of a rotor assembly used in the motor shown in FIG. 1.
FIG. 7 is an exploded perspective view of the rotor assembly shown in FIG. 6.
Figure 8:
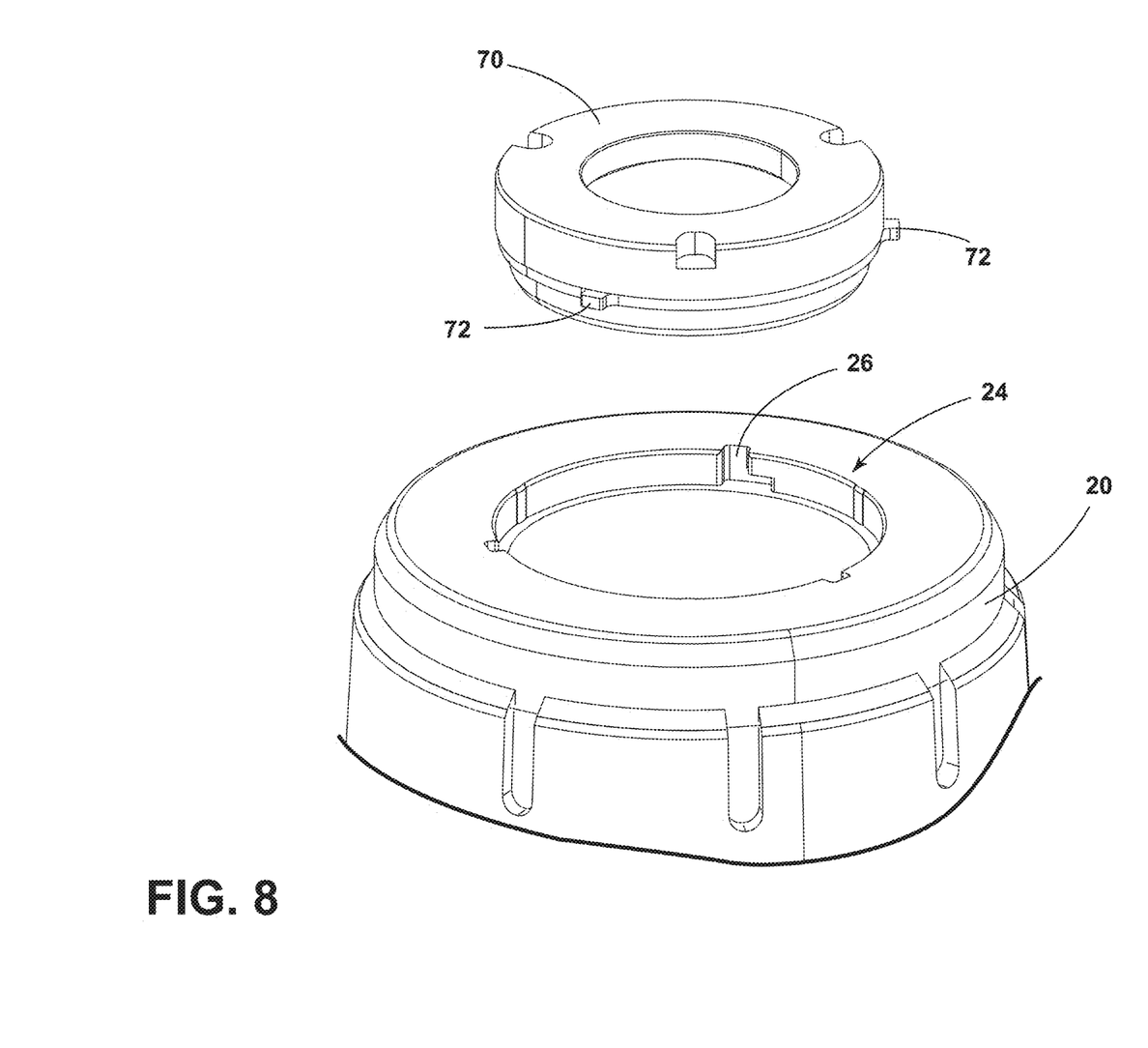
FIG. 8 is a partially exploded perspective view of a portion of the motor shown in FIG. 1.

FIGS. 6 and 7 show an example of a rotor assembly 50 that may be used in the motor 10. The rotor assembly 50 may include a shaft 52 onto which a plurality of magnets 54 are held in place by a magnet sleeve 55. A top bearing 56 and a bottom bearing 57 may be provided at opposite ends of the shaft 52 to support the rotor assembly 50 within the stator assembly 60 such that it may rotate relative to the stator assembly 60 and the remainder of the motor 10. As shown in FIG. 2, the rotor assembly 50 slides into an opening 24 formed on the bottom of the overmold assembly 20. As also shown in FIG. 8, a cap 70 is secured within the opening 24 to hold the rotor assembly 50 within the overmold assembly 20. The cap 70 may include tabs 72 that engage corresponding slots 26 formed in the mouth of the opening 24 such that the cap 70 may be inserted and then twisted to lock in place.

Figure 9:
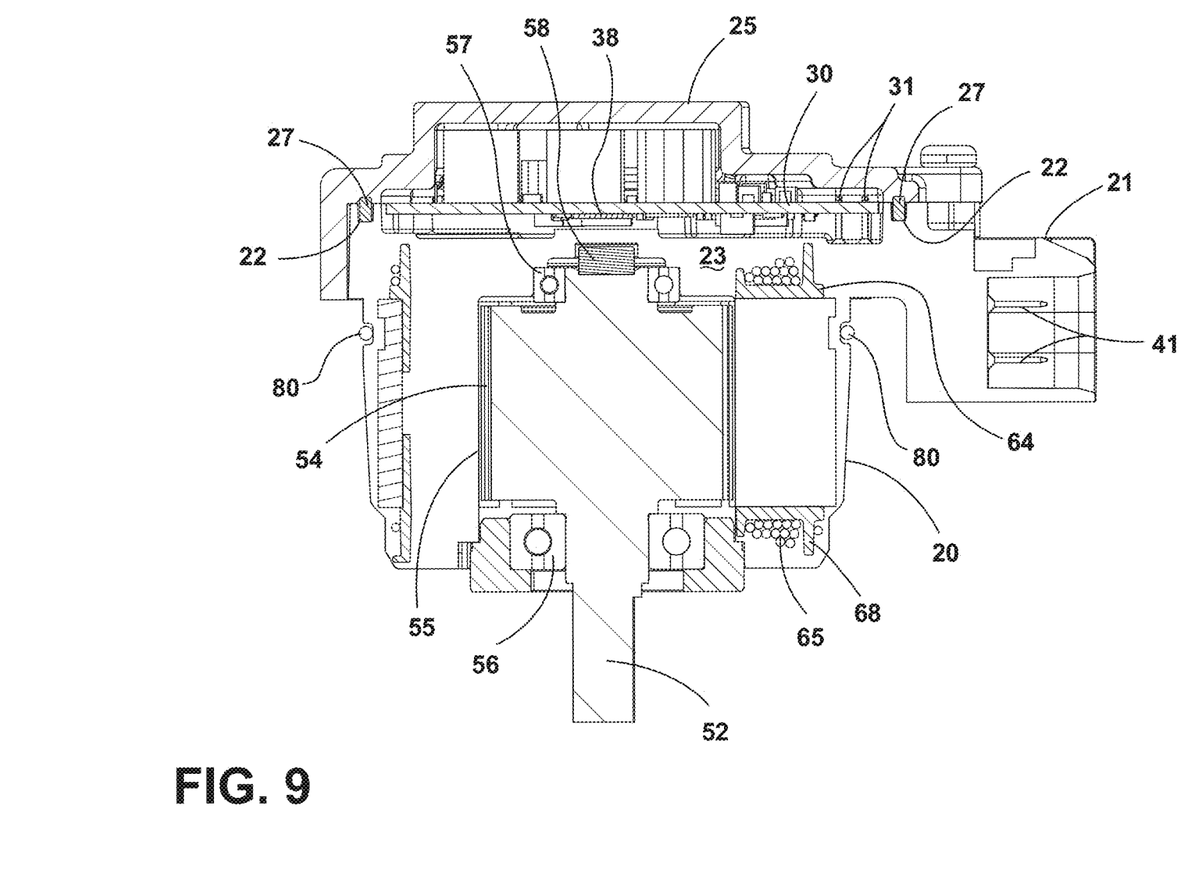
FIG. 9 is a cross-sectional view of a portion of the motor shown in FIG. 1.
Figure 10:
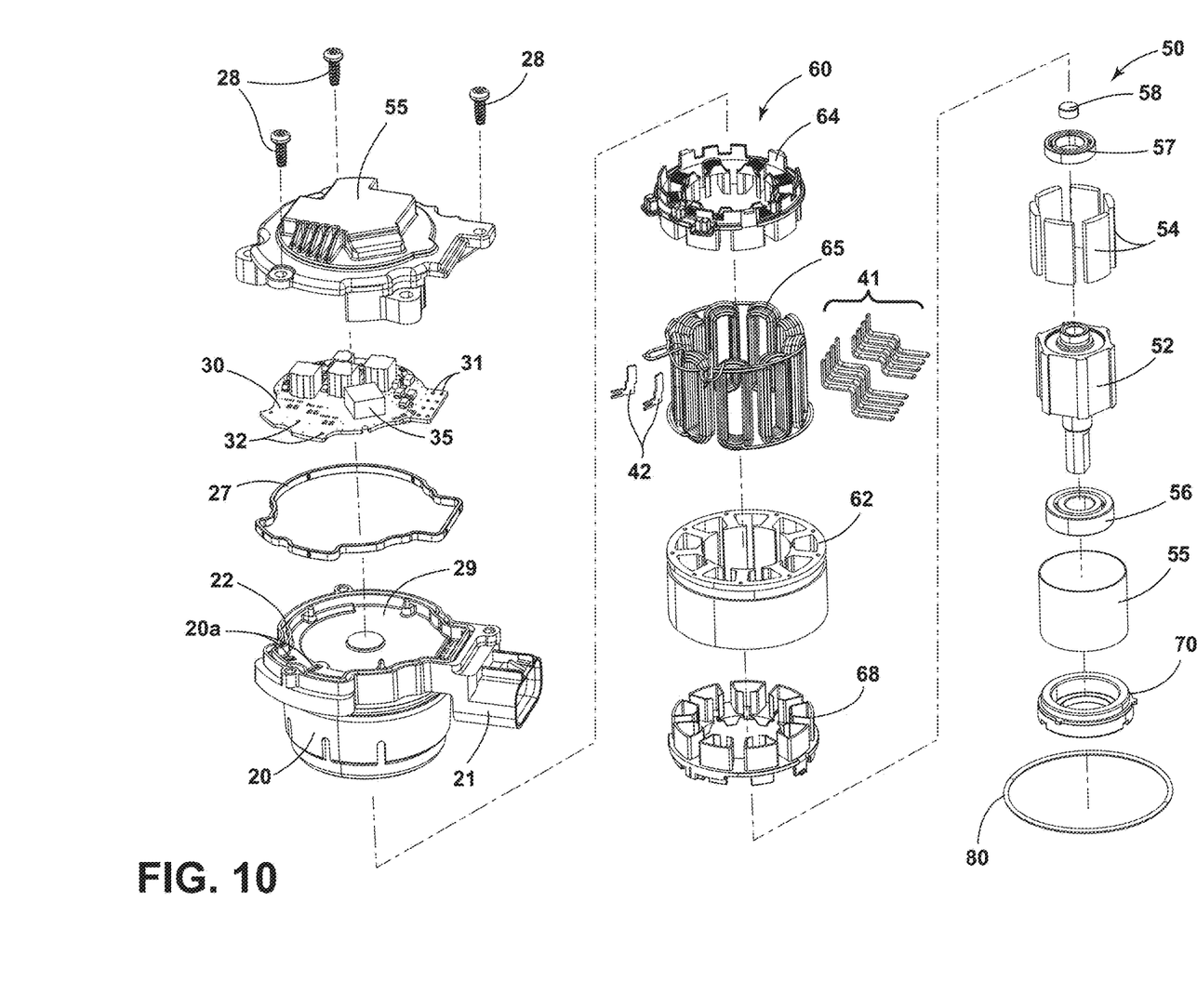
FIG. 10 shows perspective views of each of the components of the motor shown in FIG. 1

As shown in FIGS. 7 and 9, a magnet 58 may be provided on top of the rotor assembly 50. Further, a magnetic sensor 38 may be mounted on the underside of the PCB 30. The shaft 52 of the rotor assembly 50 has an axis of rotation and the magnet 58 has a south pole 58a and a north pole 58b, The south pole 58a of the magnet 58 being located on one side of the axis of rotation and the north pole 58b being located on an opposite side of the axis of rotation so that the relative angular position of the magnet 58 (and hence the shaft of the rotor assembly 50), may be sensed by the sensor 38. The sensor 38 may be mounted on the "dry side" of the motor 10 whereas the magnet 58 is on the "wet side" where oil or other fluid is provided. The top of the overmold assembly 20 between the magnet 58 and the sensor 38 serves as a non-magnetic barrier or membrane 29 that is impervious to the fluid on the "wet side." The gaps between the magnet 58, the membrane 29, and the sensor 38 are selected to allow the sensor 38 to accurately sense the angular rotation of the magnet 58. For example, the air gap between the top of the magnet 58 and the bottom of the membrane 29 of the overmold assembly 20 may be about 0.5 mm, the membrane 29 of the overmold assembly 20 may have a thickness of about 2.0 mm, the air gap between the bottom of the sensor 38 and the top of the membrane 29 of the overmold assembly 20 may be about 0.5 mm, and the sensor thickness may be about 0.9 mm. The overmold assembly may be integrally formed and may be of any material through which a magnetic field may be passed, such as a thermoplastic material, for example.

A gasket 80 may be provided at the lower end of the overmold assembly 20 to seal the motor 10 within the hole of the transmission with which the motor 10 is used.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An electric motor configured for mounting within a hole formed in a vehicle transmission housing to turn an impeller of a pump internal to the transmission housing, the electric motor comprising:
   a stator assembly;
   a rotor assembly for rotating inside the stator assembly, the rotor assembly including a shaft;
   a magnet mounted on the shaft of the rotor assembly;
   a printed circuit board;
   a magnetic sensor mounted on the printed circuit board;
   an overmold assembly having a membrane disposed between the magnet and the magnetic sensor such that the magnetic sensor can sense the angular position of the magnet through the membrane; and
   a gasket provided on the overmold assembly to seal the motor within the hole of the transmission with which the motor is used.

2. The electric motor of claim 1, wherein the shaft has an axis of rotation and the magnet has a south pole and a north pole, the south pole of the magnet being located on one side of the axis of rotation and the north pole being located on an opposite side of the axis of rotation.

3. The electric motor of claim 1, wherein the overmold assembly has a groove formed in a top raised edge surrounding the membrane, and wherein the electric motor further comprises:
   a seal positioned in the groove; and
   a cover mounted to the top of the overmold assembly to provide a sealed chamber therebetween in which the printed circuit board is mounted.

4. The electric motor of claim 1, wherein the stator includes an opening and the overmold assembly comprises an opening aligned with the opening of the stator assembly for receiving the rotor assembly.

5. The electric motor of claim 4 and further comprising a cap for engaging the overmold assembly around the opening such that the rotor assembly is secured inside the overmold assembly.

6. The electric motor of claim 1, wherein the overmold assembly includes a connection port for electrical connection to a plurality of connector terminals extending from the printed circuit board.

7. The electric motor of claim 1, wherein the rotor assembly includes a shaft and first and second bearings disposed at either end of the shaft.

8. The electric motor of claim 1, wherein the membrane includes a plurality of apertures for receiving motor connectors that extend from the stator assembly to the printed circuit board, and wherein the membrane is sealed around the motor connectors that extend through the plurality of apertures.

9. An electric motor configured for mounting within a hole formed in a vehicle transmission housing to turn an impeller of a pump internal to the transmission housing, the electric motor comprising:
   an overmold assembly having a membrane at one end and an opening at an opposite end, the opening extending through the overmold assembly up to the membrane;

a stator assembly disposed in the opening of the overmold assembly, the stator assembly including a stator opening;

a rotor assembly for rotating inside the opening of the stator assembly, the rotor assembly including a shaft;

a magnet mounted on the shaft of the rotor assembly;

a cover mounted to the overmold assembly to provide a sealed chamber between the cap and the membrane;

a printed circuit board mounted in the sealed chamber;

a magnetic sensor mounted on the printed circuit board in a position juxtaposed to the magnet with the membrane in between such that the magnetic sensor can sense the angular position of the magnet through the membrane; and a gasket provided on the overmold assembly to seal the motor within the hole of the transmission with which the motor is used.

10. The electric motor of claim 9, wherein the overmold assembly has a groove formed in a top raised edge surrounding the membrane, and wherein the electric motor further comprises a seal positioned in the groove to seal the cover to the overmold assembly.

11. The electric motor of claim 9, wherein the shaft has an axis of rotation and the magnet has a south pole and a north pole, the south pole of the magnet being located on one side of the axis of rotation and the north pole being located on an opposite side of the axis of rotation.

12. The electric motor of claim 9 and further comprising a cap for engaging the overmold assembly around the opening such that the rotor assembly is secured inside the overmold assembly.

13. The electric motor of claim 9, wherein the overmold assembly includes a connection port for electrical connection to a plurality of connector terminals extending from the printed circuit board.

14. The electric motor of claim 9, wherein the rotor assembly includes a shaft and first and second bearings disposed at either end of the shaft.

15. The electric motor of claim 9, wherein the membrane includes a plurality of apertures for receiving motor connectors that extend from the stator assembly to the printed circuit board, and wherein the membrane is sealed around the motor connectors that extend through the plurality of apertures.

16. An electric motor configured for mounting within a hole formed in a vehicle transmission housing to turn an impeller of a pump internal to the transmission housing, the electric motor comprising:

an overmold assembly having a membrane at one end and an opening at an opposite end, the opening extending through the overmold assembly up to the membrane, wherein the overmold assembly has a groove formed in a top raised edge surrounding the membrane;

a seal positioned in the groove to seal the cover to the overmold assembly;

a cover mounted to the overmold assembly to provide a sealed chamber between the cap and the membrane;

a printed circuit board mounted in the sealed chamber;

a stator assembly disposed in the opening of the overmold assembly and electrically coupled to the printed circuit board through sealed apertures formed through the membrane, the stator assembly including a stator opening;

a rotor assembly for rotating inside the opening of the stator assembly, the rotor assembly including a shaft;

a magnet mounted on the shaft of the rotor assembly;

a magnetic sensor mounted on the printed circuit board in a position juxtaposed to the magnet with the membrane in between such that the magnetic sensor can sense the angular position of the magnet through the membrane; and a gasket provided on the overmold assembly to seal the motor within the hole of the transmission with which the motor is used.

17. The electric motor of claim 16, wherein the shaft has an axis of rotation and the magnet has a south pole and a north pole, the south pole of the magnet being located on one side of the axis of rotation and the north pole being located on an opposite side of the axis of rotation.

18. The electric motor of claim 16 and further comprising a cap for engaging the overmold assembly around the opening such that the rotor assembly is secured inside the overmold assembly.

19. The electric motor of claim 16, wherein the overmold assembly includes a connection port for electrical connection to a plurality of connector terminals extending from the printed circuit board.

20. The electric motor of claim 16, wherein the rotor assembly includes a shaft and first and second bearings disposed at either end of the shaft.

* * * * *